United States Patent
Spragg et al.

(10) Patent No.: US 6,260,593 B1
(45) Date of Patent: Jul. 17, 2001

(54) RACE TIRE CONTAINING BAND ELEMENT

(75) Inventors: Charles D. Spragg, Hudson; Gregory D. Chaplin, Chippewa Lake; Dale R. Harrigle, Jr.; James M. Kirby, both of Akron, all of OH (US)

(73) Assignee: Bridgestone/Firestone Research, Inc., Akron, OH (US)

( * ) Notice: Subject to any disclaimer, the term of this patent is extended or adjusted under 35 U.S.C. 154(b) by 0 days.

(21) Appl. No.: 09/368,092

(22) Filed: Aug. 3, 1999

Related U.S. Application Data

(60) Provisional application No. 60/095,319, filed on Aug. 4, 1998.

(51) Int. Cl.[7] .................................. B60C 9/18; B60C 9/26
(52) U.S. Cl. ........................... 152/197; 152/526; 152/529
(58) Field of Search ...................................... 152/526, 197, 152/529

(56) References Cited

U.S. PATENT DOCUMENTS

| | | |
|---|---|---|
| 3,850,219 | 11/1974 | Snyder . |
| 4,111,249 | 9/1978 | Markow . |
| 4,318,434 | 3/1982 | Markow . |
| 4,428,411 | 1/1984 | Markow et al. . |
| 4,456,048 | 6/1984 | Markow et al. . |
| 4,459,167 | 7/1984 | Markow et al. . |
| 4,673,014 | 6/1987 | Markow . |
| 4,734,144 | 3/1988 | Markow . |
| 4,794,966 | 1/1989 | Markow . |
| 5,879,484 | 3/1999 | Spragg et al. . |
| 6,012,498 | * 1/2000 | Koch ..................................... 152/197 |
| 6,112,791 | * 9/2000 | Spragg et al. .................... 152/197 X |
| 6,117,258 | * 9/2000 | Spragg et al. ................... 152/526 X |
| 6,148,885 | * 11/2000 | Spragg et al. ................... 152/526 X |

FOREIGN PATENT DOCUMENTS

| | | |
|---|---|---|
| 0 114 460 A2 | 8/1984 | (EP) . |
| 0 191 124 A1 | 8/1986 | (EP) . |
| 0 200 055 A2 | 11/1986 | (EP) . |
| 0 357 826 B1 | 3/1990 | (EP) . |
| 0 372 677 A2 | 6/1990 | (EP) . |
| 0 537 780 A2 | 4/1993 | (EP) . |
| 0 664 229 A1 | 7/1995 | (EP) . |
| 0 853 009 A2 | 11/1997 | (EP) . |
| 61-69437 | 4/1986 | (JP) . |
| 6-16008 | 1/1994 | (JP) . |

OTHER PUBLICATIONS

Derwent Abstract of EPO Publication 0 191 124*.
*Derwent Abstract provides English language explanation per 37 CFR 1.98(a)(3).

* cited by examiner

*Primary Examiner*—Adrienne C. Johnstone
(74) *Attorney, Agent, or Firm*—Thomas R. Kingsbury; Michael Sand

(57) ABSTRACT

A pneumatic race tire has an elastomeric casing with a tread in the crown portion thereof, a pair of bead areas and a body ply carcass extending continuously between the bead areas and through the sidewalls and crown portion. A continuous thin annular band formed of a high strength, lightweight material such as metal, fiberglass, a composite material or the like is located radially inwardly of the tread and between the tread and body ply carcass to enhance tire performance by reducing the thickness of the tread area.

12 Claims, 4 Drawing Sheets

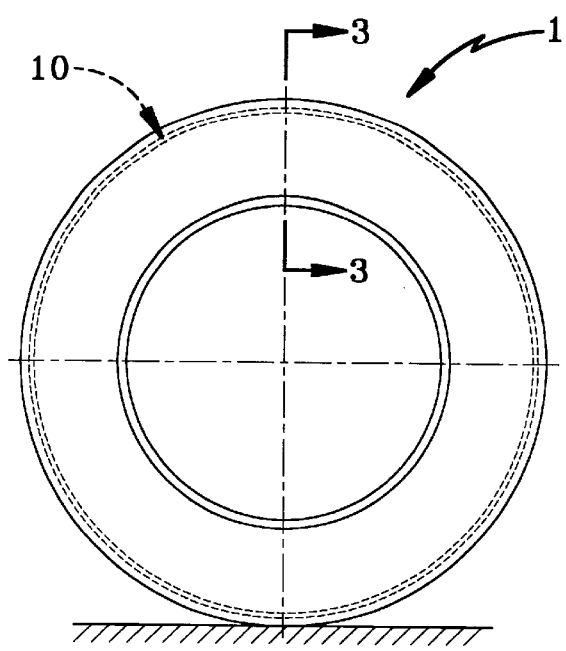
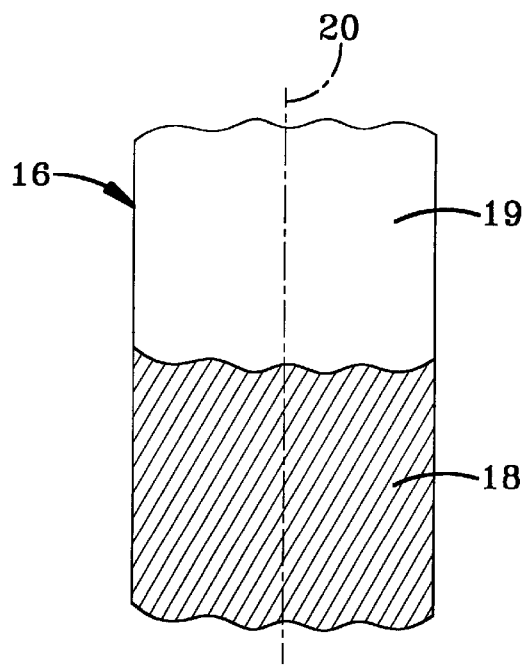
FIG-1  FIG-4A
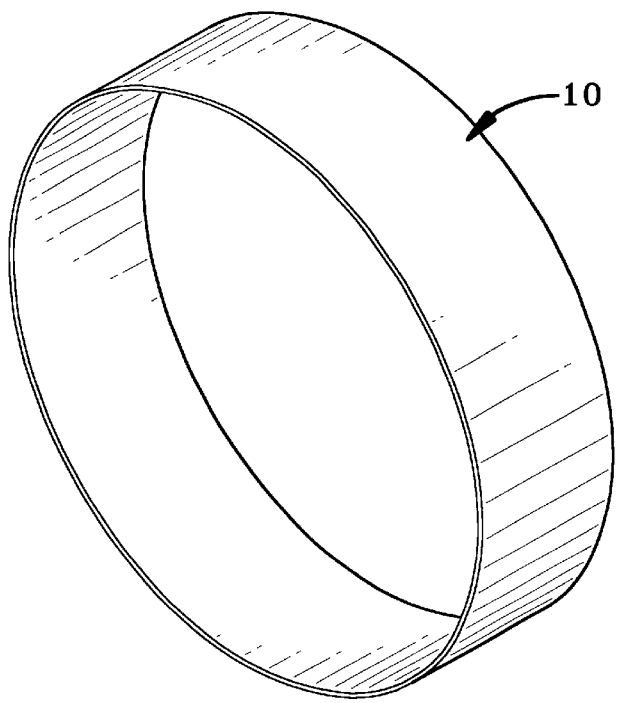
FIG-2

RACE TIRE CONTAINING BAND ELEMENT

CROSS REFERENCE TO RELATED APPLICATION

This application claims the benefit of U.S. Provisional Application Ser. No. 60/095,319, filed Aug. 4, 1998.

BACKGROUND OF THE INVENTION

TECHNICAL FIELD

The invention relates to a pneumatic race tire and more particularly to a race tire reinforced by a thin annular composite band located in the tread area of the tire which provides a compression element replacing the heretofore stiff belt packages currently used on race tires.

BACKGROUND INFORMATION

Currently race tires use rubber reinforced with nylon, polyester, aramid, or other similar reinforcing cords embedded in a layer of the rubber to form a flexible belt package which is molded beneath the vehicle tread in combination with body plies that extend on a bias underneath the belt to stiffen the tire in order to carry the high loads that a race tire must transmit in cornering, driving, and braking applications.

Race tires are generally for use on dry pavement and thus do not have a tread pattern in order to provide better adhesion to the road surface. The tread gauge is extremely thin, for example, less than 0.5 inches, to avoid the heat that would be generated internally by a thicker rubber tread. When deflected or strained a piece of rubber will generate heat internally. Thus, deflections of the tread rubber in the footprint would lead to excessive heat generation in the tread area which would cause the tread to degrade and blister rapidly if a relatively thick rubber tread is utilized. Thus, race tires use the lightest weights and gauges of materials wherever possible to avoid heat generation. For example, at speeds of 120 mph, the tire turns approximately 26 times a second. Thus, excessive heat could be generated in the footprint area and throughout the tire if an excessively thick rubber tread is utilized.

Furthermore, the belt area of a race tire must be as strong as possible since it has to transmit high cornering, driving, and braking forces to the pavement while at the same time being strong enough to resist the centrifugal force being exerted on the tire. For example, the rotational rate of an Indy-type race tire can exceed 40 hz at speeds over 220 mph. Throughout a race the tire is operated constantly at its limit of grip and at elevated temperatures with the race cars transmitting up to 800 hp through the two rear tires severely stressing the rear tires.

Thus, it is advantageous to provide a race tire which is able to use a relatively thin thickness of rubber in the smooth tread area yet has sufficient internal structure to provide the higher load carrying capability and extreme forces and heat which it experiences during the course of a race.

Various pneumatictires for usual passenger-type vehicles have incorporated a thin annular band which extends circumferentially throughout the tire beneath the tread area which, in addition to providing strength to the tire, provides a more puncture resistant tire and a tire able to run after loss of internal air pressure. Some examples of these prior art banded run flat tires are shown in U.S. Pat. Nos: 4,111,249; 4,318,434; 4,428,411; 4,456,048; 4,459,167; 4,673,014; 4,734,144; 4,794,966 and Japanese patent application No. JP63141809. Although these banded tires have proved to have some success for use in passenger tires such a band element has yet to be considered for use in or incorporated for use in a race tire to achieve increased performance.

SUMMARY OF THE INVENTION

Objectives of the invention include providing an improved race tire having an internal compression band which reduces the need for rubber as a structural member, thereby when deflected in the footprint, it generates a reduced amount of heat than that generated by stiffening bands using rubber as an element thereof.

Another objective of the invention is to provide such a race tire which eliminates at least two of the reinforcing belts used in the tread area of the tire, which further reduces the amount of heat generated in this area of the tire to provide increased life to the race tire.

Still another objective of the invention is to provide such a race tire which does not appreciably change diameter with increased speed as a conventional race tire since the conventional fire reinforcing belts deflect a greater amount under the centrifugal loading caused by high speeds, wherein the band element of the present invention is stiff enough to carry the centrifugal loads without significant deflection or growth.

A further objective of the invention is to provide such a race tire in which the band element is lighter in weight than the belt packages it will replace which will lead to better acceleration and braking performance of the race vehicle due to the lighter weight and lower moment of inertia of the tire.

A still further objective of the invention is to provide such a race tire in which the internal band element will more uniformly distribute the forces occurring at the footprint into the body plies of the tire due to the higher stiffness of the band, and in which this uniform distribution of the footprint forces will lead to higher load carrying capability and higher cornering stifffness as compared to a race tire using a conventional belt package containing rubber and internal nylon reinforcing cords.

Another objective of the invention is to provide such a race tire in which the internal band element is formed of graphite fibers imbedded in a suitable matrix or resin such as thermoplastic or thermosetting plastic material, wherein the band is made up of multiple layers of fiberwith each layer having a bias angle or orientation relative to the tire axis thereby having a high "out of plane" bending stiffness which enables it to carry higher loads and disperse the load further away from the footprint.

A further objective of the invention is to provide such a race tire in which the band element is made of metal, such as steel or aluminum, fiberglass or a hybrid of high strength, lightweight materials.

Still another objective of the invention is to provide such a race tire in which the internal band element provides higher load carrying capability, increased cornering stiffness, lower rolling resistance, increased resistance to puncture, improved uniformity, less growth at higher speeds, uniform footprint pressure, and moving the occurrence of standing wave phenomenon to a higher speed than race tires using conventional rubber reinforced belt packages.

These objectives and advantages are obtained by the improved pneumatic race tire of the present invention, the general nature of which may be stated as including an elastomeric casing with a tread formed in a crown portion thereof, sidewalls extending from shoulder areas of the crown portion to a pair of spaced bead areas, a body ply carcass extending continuous between the bead areas through the sidewalls and crown portion, said improvement including a continuous thin annular band formed of a high strength, lightweight material located radially inwardly of the tread and between said tread and body ply carcass.

BRIEF DESCRIPTION OF THE DRAWINGS

The preferred embodiments of the invention, illustrative of the best modes in which applicants contemplate applying the principles, are set forth in the following description and are shown in the drawings and are particularly and distinctly pointed out and set forth in the appended claims.

FIG. 1 is a side elevational view of a race tire showing the band element contained therein shown in dot-dash lines;

FIG. 2 is a perspective view of the band element removed from the tire of FIG. 1;

FIG. 4A is a fragmentary plan view with portions broken away and in sections showing the stabilizer ply which partially surrounds the band element shown in FIG. 4.

Similar numerals refer to similar parts throughout the drawings.

DESCRIPTION OF THE PREFERRED EMBODIMENTS

Figure 3:
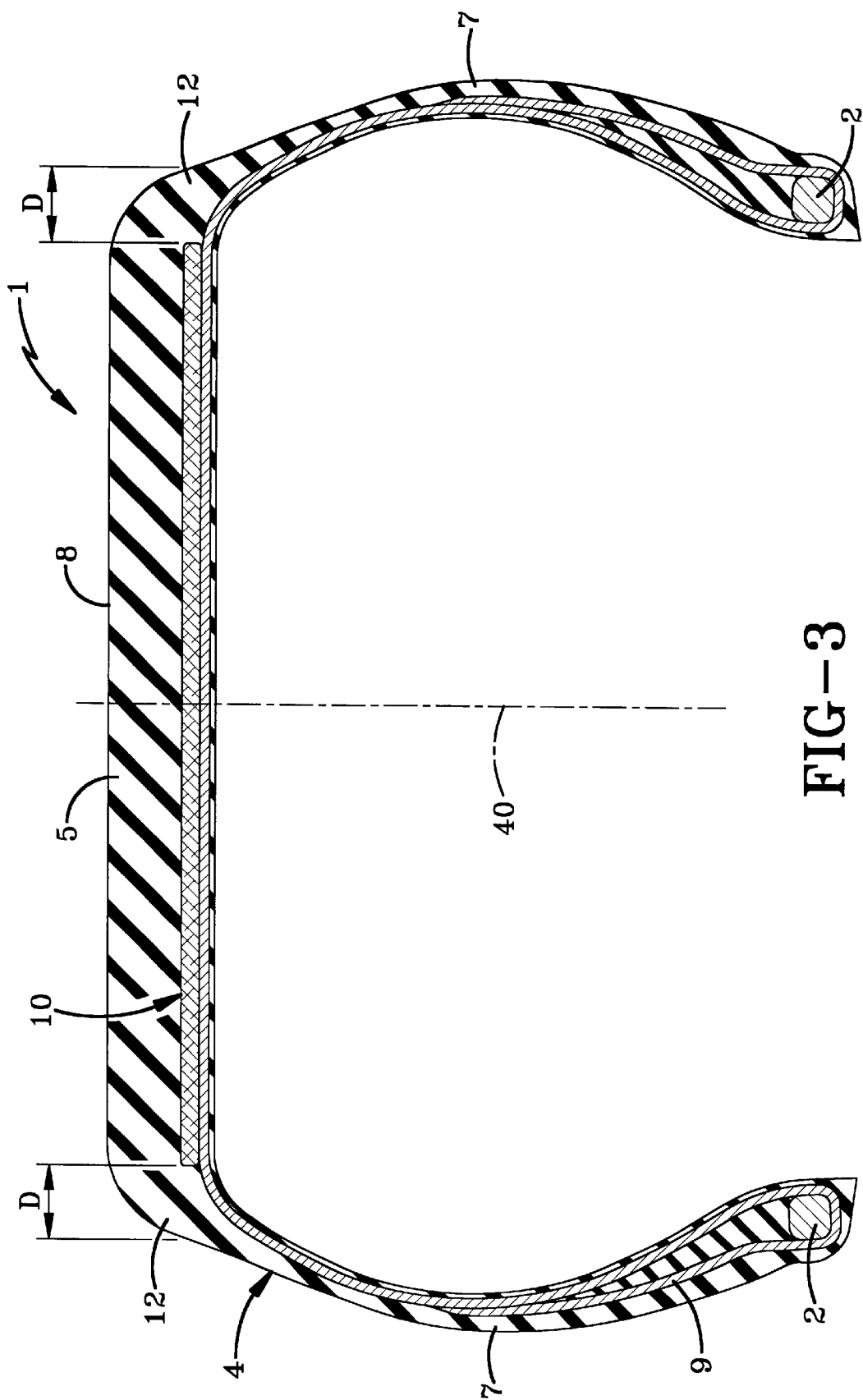
FIG. 3 is an enlarged sectional view through the pneumatic race tire of FIG. 1 taken on line 3—3.

The improved pneumatic race tire of the present invention is indicated generally at 1, and is shown in reduced elevation in FIG. 1 and in enlarged cross section in FIG. 3. Many of the components of tire 1 are of a conventional design found in most race tires and consists of a pair of beads 2 which are adapted to be sealed in an airtight relationship on a wheel. Tire 1 further comprises a casing 4 having an outer peripheral tread portion 5 in a crown region of the tire and sidewalls 7 which extend on both sides from the crown portion to beads 2. Tread 5 is generally formed of solid rubber and has a smooth outer surface 8 free from indentations and other grooves, lugs, etc. normally found in usual passenger tires, in order to provide better traction to the race track surface. Sidewalls 7 of the casing are reinforced by usual reinforcing body plies 9 which extend throughout the sidewalls and are turned up about beads 2. As is well known in the art, body plies 9 are strips of rubber containing reinforcing fibers composed of rayon, nylon, polyester, steel and other types of known materials. In accordance with one of the features of the invention, the body plies are at a bias generally between 5 degrees and 45 degrees. Body plies 9 extend from beneath the crown portion of the tire and throughout the sidewalls to the bead areas.

In accordance with one of the features of the invention, an annular stiffening band indicated generally at 10 is mounted within the crown portion of the tire radially beneath the tread 5 and extends circumferentially throughout the tire. Band 10 is operatively connected to the sidewalls 7 either physically or through the intervening elastomeric materials of the crown portion, which bond the band to the reinforcing elements and radially stabilize the band. Band 10 is relatively thin in contrast to its width and can range between 6 and 15 inches and in thickness substantially between 0.05 and 0.2 inches depending upon the particular race tire in which it is bonded. In the preferred embodiment, band 10 has a width preferably within the range of between 9 and 15 inches and a thickness of approximately 0.1 inches. As shown in FIG. 3, band 10 has a width which extends generally throughout the width of tread 5 preferably terminating a short distance from the outside surface of tire shoulders 12 as indicated at "D". "D" is preferably in the range of 0.25 and 0.75 inches.

It is also understood that the tire may include an innerliner, gum abrasive strips and other components present in the usual pneumatic race tires which are not shown in FIG. 3 or discussed in further detail.

As discussed above, the object of the invention is the providing of a race tire which has higher load carrying capability, increased cornering stiffness, lower rolling resistance, increased resistance to puncture, improved uniformity, less growth at higher speeds, uniform footprint pressure and moving the occurrence of standing wave phenomena to a higher speed by the incorporation of band element 10 beneath the tread component of the race tire, which to applicant's knowledge has never been utilized before the present invention. Likewise, band element 10 may reduce the tread thickness thereby providing a cooler running tire. The less distortion in the footprint is a result of eliminating the pantograph effect in the cords of a conventional belt package. It also may reduce the amount of material in the belt package while enhancing performance as discussed above.

The particular high strength compression band element 10 may be formed of a plurality of helically wound adjacently positioned flat strips of material which form a plurality of wound layers of material strips. Portions of the strips which are located in the outermost layer of the composite band may be prestressed in tension to increase the maximum stress at a footprint area. Preferably the strips are formed of graphite fiber reinforced thermoplastic material, although the same could be formed from a group of materials consisting of steel, aluminum, fiberglass, nylon, and various aramid fibers and combinations thereof. The band will have a modulus within the range of 6 and 22 million psi. The exact details of construction and method of producing a band is shown in U.S. patent application Ser. No. 08/782,364, filed Jan. 13, 1997, the contents of which are incorporated herein by reference and thus are not disclosed in further detail. The band also could be formed of twisted fibers shown in a corresponding pending patent application Ser. No. 09/120,210, filed Jul. 21, 1998, the contents of which are also incorporated herein by reference.

The incorporation of band element 10 eliminates the heretofore use of the standard belt package used in race tires which consisted of various layers of reinforcing fibers embedded in rubber strips. The use of band 10 reduces the amount of rubber in the tread area and correspondingly the amount of heat generated therein as discussed previously, by eliminating these heretofore used belt packages.

Figure 4:
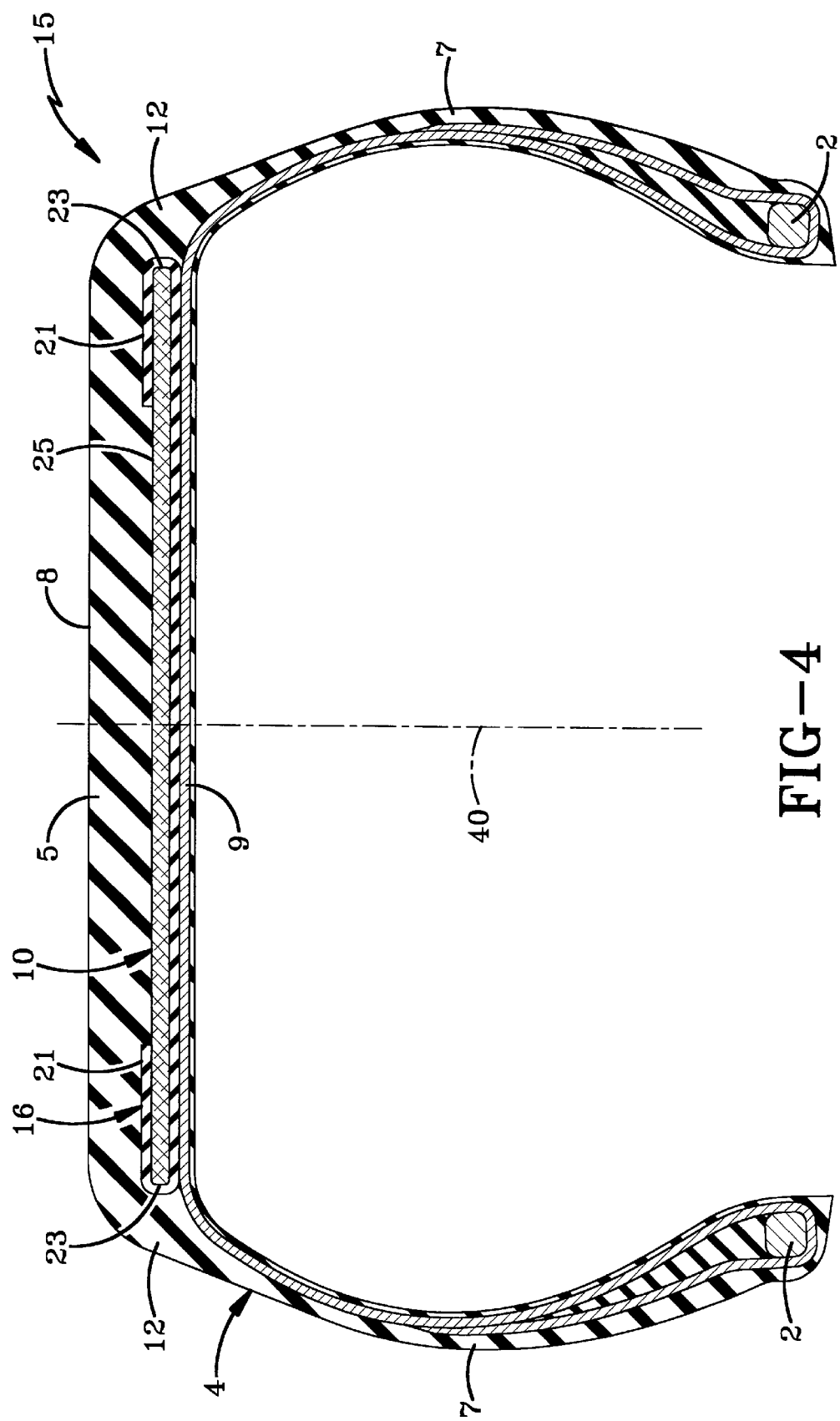
FIG. 4 is a sectional view similar to FIG. 3 of a modified race tire having the band element incorporated therein.

A slightly modified band element race tire is indicated generally at 15, and is shown in FIG. 4. Race tire 15 is similar to tire 1 as described above with the main difference being that band 10 is partially wrapped with a conventional stabilizer ply indicated at 16. Ply 16 is of a conventional construction consisting of a plurality of reinforcing fibers 18 formed of various synthetic materials such as nylon, aramid, etc. as shown in FIG. 4A, which are embedded within a thin coating of rubber 19. Fibers 18 preferably are biased to the longitudinal axis 20 of the strip at an angle in the general range of between 45° and 75°. However, this bias angle could vary without affecting the concept of the invention.

As shown in FIG. 4, stabilizing ply 16 extends between body ply carcass 9 and band 10 with the ends 21 thereof extending around band edges 23 and partially along top surface 25 of the band. Ends 21 preferably have a length of approximately ⅛ the width of band 10. It has been found that this construction increases the adhesion between the band and rubber of tread 5 and the rubber of sidewall 7.

Figure 5:
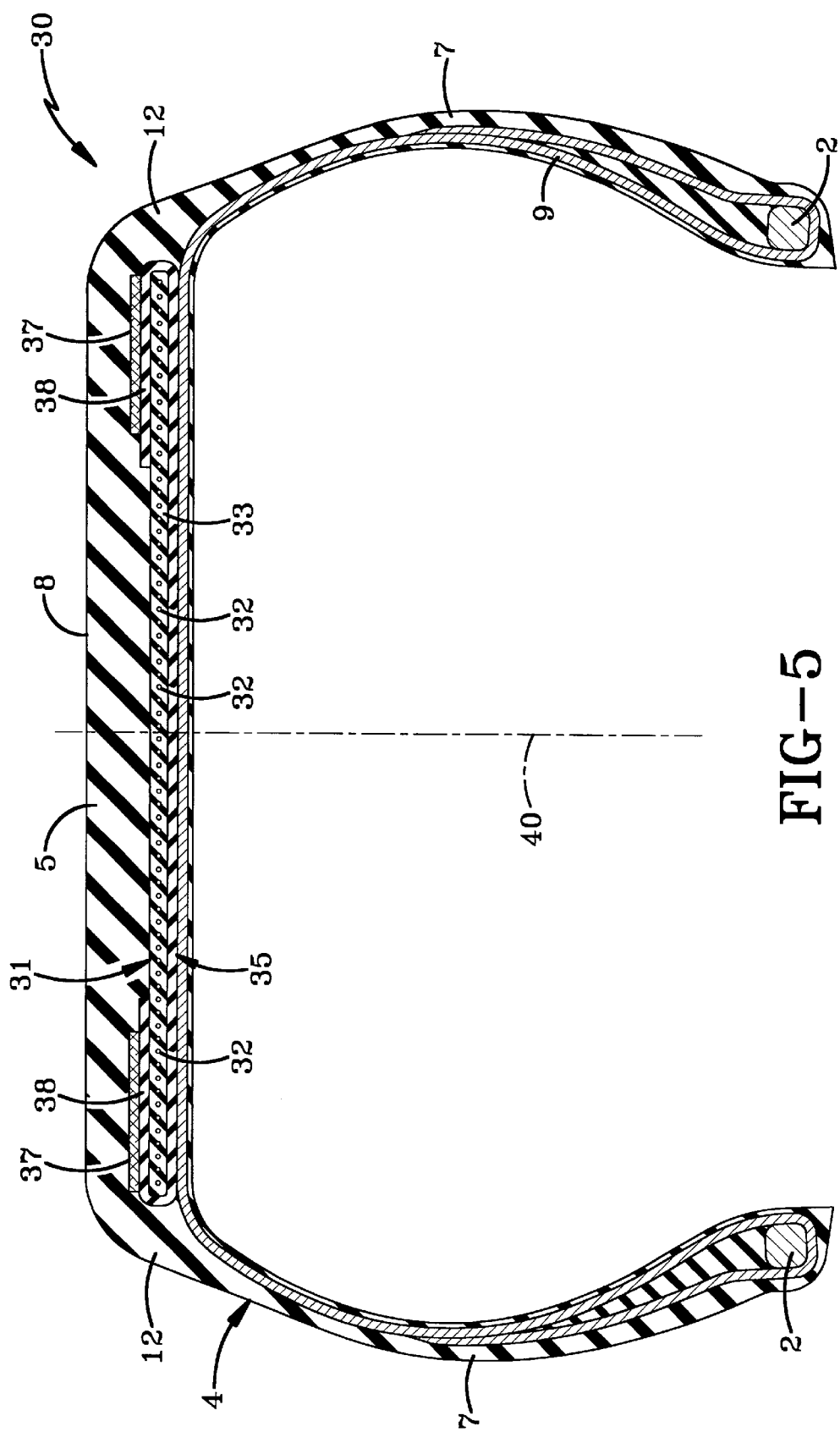
FIG. 5 is a sectional view similar to FIGS. 3 and 4 showing a further modification of a race tire having the band element incorporated therein.

A further modified race tire having a band element incorporated therein is shown in FIG. 5 and is indicated generally at 30. A conventional belt package 31 consisting of a plurality of reinforcing fibers 32 which are embedded within an elastomeric matrix 33, are partially surrounded by a stabilizing ply 35 similar to ply 16 discussed above, in combination with a pair of annular bands 37 which are located radially outward of the turned ends 38 of stabilizer ply 35 and beneath tread 5. Ends 38 of stabilizer ply 35 preferably extend inwardly beyond the inner edges of bands 37 toward tire centerline axis 40 a distance of 0.25 to 0.50 inches. Bands 37 preferably are of the same composition as band 10 discussed above but are of an extremely narrower width, for example, between 0.5 and 3.0 inches and extend circumferentially throughout the tire and are positioned as shown in FIG. 5.

Accordingly, the improved race tire containing band element is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the race tire containing band element is constructed and used, the characteristics of the construction, and the advantageous new and useful results obtained; the new and useful structures, devices, elements, arrangements, parts, and combinations are set forth in the appended claims.

What is claimed is:

1. An improved pneumatic race tire including an elastomeric casing with a tread formed in a crown portion thereof, sidewalls extending from shoulder areas of the crown portion to a pair of spaced bead areas, a body ply carcass extending continuous between the bead areas through the sidewalls and crown portion, said improvement including a continuous thin annular band formed of a high strength, lightweight material located radially inwardly of the tread and between said tread and body ply carcass, and a stabilizer ply formed of a fiber reinforced elastomeric strip located radially of the tread between the body ply and annular band, said stabilizer ply having ends extending about ends of said annular band and partially along an outer surface of said band.

2. The improved pneumatic race tire defined in claim 1 wherein each of the ends of the stabilizer ply extends along the outer surface of the band approximately ⅛ of the width of said band.

3. The improved pneumatic race tire defined in claim 1 in which the cords of the stabilizer ply are biased to a longitudinal axis of said stabilizer ply at an angle generally in the range of 45° to 75°.

4. The improved pneumatic race tire defined in claim 1 in which the annular band is located in the crown portion and extends generally between the shoulder areas of said crown portion.

5. The improved pneumatic race tire defined in claim 4 which the width of said annular band is generally in the range of between 6 and 15 inches.

6. The improved pneumatic race tire defined in claim 4 in which the said annular band has a thickness generally in the range of 0.05 and 0.2 inches.

7. The improved pneumatic race tire defined in claim 4 in which the said annular band terminates approximately 0.25 to 0.75 inches before the shoulder areas.

8. The improved pneumatic race tire defined in claim 1 in which the annular band is formed of a composite material including strips of graphite fiber embedded in a thermoplastic material.

9. The improved pneumatic race tire defined in claim 1 in which the body ply carcass contains reinforcing cords which are at a bias generally between 5° and 45°.

10. The improved pneumatic race tire defined in claim 1 in which the tread has a smooth outer surface free of grooves and indentations.

11. At The improved pneumatic race tire defined in claim 1 in which the band is formed of a material selected from a group consisting of fiberglass, steel, aluminum, nylon, aramid fibers and a graphite reinforced thermoplastic.

12. The improved pneumatic race tire defined in claim 1 in which the annular band has a modulus of elasticity within the range of 6 and 22 million psi.

* * * * *